United States Patent
Kim et al.

(10) Patent No.: US 8,590,957 B2
(45) Date of Patent: Nov. 26, 2013

(54) STORING APPARATUS OF REAR SEAT FOR MULTI PURPOSE VEHICLE

(75) Inventors: Sang Ho Kim, Incheon (KR); Deok Soo Lim, Hwaseong-si (KR); Soo Hyun Moon, Hwaseong-si (KR); Chang Oan Woo, Hwaseong-si (KR); Jun Yeol Heo, Suwon-si (KR); Jae Myung Hur, Ansan-si (KR); Jang Woo Byun, Ansan-si (KR)

(73) Assignees: Hyundai Motor Company, Seoul (KR); Kia Motors Corp., Seoul (KR); Dae Won San Up Co., Ltd., Ansan-Si (KR)

( * ) Notice: Subject to any disclaimer, the term of this patent is extended or adjusted under 35 U.S.C. 154(b) by 0 days.

(21) Appl. No.: 13/551,234

(22) Filed: Jul. 17, 2012

(65) Prior Publication Data

US 2013/0147224 A1     Jun. 13, 2013

(30) Foreign Application Priority Data

Dec. 7, 2011 (KR) .......................... 10-2011-0130533

(51) Int. Cl.
  *B60N 2/02* (2006.01)
(52) U.S. Cl.
  USPC ...................................................... 296/65.01
(58) Field of Classification Search
  USPC ........... 296/63, 64, 65.1, 66, 69; 297/15, 235, 297/243, 335, 536
  See application file for complete search history.

(56) References Cited

U.S. PATENT DOCUMENTS

| | | | | |
|---|---|---|---|---|
| 3,202,453 | A * | 8/1965 | Richards | 296/66 |
| 5,195,795 | A * | 3/1993 | Cannera et al. | 296/65.09 |
| 5,868,451 | A * | 2/1999 | Uno et al. | 296/66 |
| 6,626,481 | B2 * | 9/2003 | Kawasaki | 296/65.01 |
| 6,955,386 | B2 * | 10/2005 | Rhodes et al. | 296/65.09 |
| 6,962,384 | B2 * | 11/2005 | Rhodes et al. | 296/66 |
| 6,997,498 | B2 * | 2/2006 | Oyama | 296/65.05 |
| 7,029,063 | B2 * | 4/2006 | Holdampf | 297/15 |
| 7,201,426 | B2 * | 4/2007 | Villeminey | 296/65.09 |
| 7,255,384 | B2 * | 8/2007 | Saberan et al. | 296/65.09 |
| 7,328,939 | B2 * | 2/2008 | Moriyama et al. | 297/15 |
| 7,452,019 | B1 * | 11/2008 | Day | 296/65.16 |
| 7,516,999 | B2 * | 4/2009 | Toyota | 296/65.13 |
| 2006/0097538 | A1 * | 5/2006 | Villeminey | 296/65.09 |
| 2011/0248523 | A1 * | 10/2011 | Aebker et al. | 296/66 |

FOREIGN PATENT DOCUMENTS

JP     2002-240607 A     8/2002

\* cited by examiner

*Primary Examiner* — Lori Lyjak
(74) *Attorney, Agent, or Firm* — Morgan, Lewis & Bockius LLP

(57) ABSTRACT

A storing apparatus of a rearmost seat for a multipurpose vehicle may include a storage space provided under a floor panel, wherein the rearmost seat may be selectively stored in the storage space, and wherein the rearmost sear includes a plurality of links disposed to pivotally connect the rearmost seat with the storage space to implement a storage mode in which the seat may be moved down and received in the storage space and a sitting mode in which the seat may be drawn upward out of the storage space.

7 Claims, 6 Drawing Sheets

(A)

(B)

STORING APPARATUS OF REAR SEAT FOR MULTI PURPOSE VEHICLE

CROSS-REFERENCE TO RELATED APPLICATION

The present application claims priority to Korean Patent Application No. 10-2011-0130533 filed on Dec. 7, 2011, the entire contents of which is incorporated herein for all purposes by this reference.

BACKGROUND OF THE INVENTION

1. Field of the Invention

The present invention relates to a storing apparatus of a rear seat for a multipurpose vehicle that makes it possible to ensure a luggage space and reduce the cost.

2. Description of Related Art

In general, a multipurpose vehicle equipped with three or four-line seats is not provided with a separate trunk room, such that, as shown in FIG. 1, a load is stacked in the space between the rearmost seat 1 and a tail gate 2, and for this configuration, a luggage space 3 can be ensured by tipping-up a seat cushion 1a of the rearmost seat 1 to a seat back 1b and then moving forward the entire seat 1.

However, in this structure of the related art, since the forward movement distance of the rearmost seat 1 is short, it is difficult to the sufficient luggage space 3, and particularly, a seat rail (not shown) is needed to move the seat 1, such that the cost increases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a storing apparatus of a rear seat for a multipurpose vehicle that makes it possible to ensure a wider luggage space by providing a storage space by a floor panel under the rearmost seat to store a load in the storage space by moving down the rearmost seat, and makes it possible to reduce the cost by removing the necessity of using a seat rail.

In an aspect of the present invention, a storing apparatus of a rearmost seat for a multipurpose vehicle may include a storage space provided under a floor panel, wherein the rearmost seat is selectively stored in the storage space, and wherein the rearmost sear may include a plurality of links disposed to pivotally connect the rearmost seat with the storage space to implement a storage mode in which the seat is moved down and received in the storage space and a sitting mode in which the seat is drawn upward out of the storage space.

The plurality of links may include a front link rotatably connecting a front portion of the storage space with a front portion of a seat cushion, and a rear link rotatably connecting a rear portion of the storage space with a seat back to which a rear portion of the seat cushion is pivotally coupled.

The plurality of links may further include a front connection link that may have one end rotatably connected to the seat back and the other end rotatably connected to the front link.

The one end of the front connection link is disposed higher than a portion in which the rear portion of the seat cushion is pivotally coupled to the seat back in the sitting mode.

The front link may include a lower link having one end rotatably coupled to a front lower end portion of the storage space, and an upper link having one end rotatably coupled to the front portion of the seat cushion, the other end rotatably coupled to the other end of the lower link, and a middle portion to which the one end of the front connection link is rotatably coupled.

The plurality of links may further include a rear connection link that may have one end rotatably connected to the seat back and the other end rotatably connected to a middle portion of the rear link.

A hinge shaft rotatably connecting the rear portion of the storage space with the rear link is equipped with a torsion spring with both ends supported in the storage space and by the rear link, and the torsion spring provides an elastic force to the rear link to help a rotation of the rear link drawn out from the storage space when the seat is converted from the storage mode into the sitting mode.

A pull lever protruding rearward is mounted on the seat back and connected with a recliner lever by a wire, and the recliner lever is integrally coupled to one end of a recliner shaft of the recliner.

According to the storing apparatus of a rear seat for a multipurpose vehicle of the present invention, since it is possible to implement a storage mode and a sitting mode for a seat by moving up/down the rearmost seat, it is possible to ensure a wider luggage space and ensure the luggage space without using a seat rail, such that it is possible to reduce the weight and the cost.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
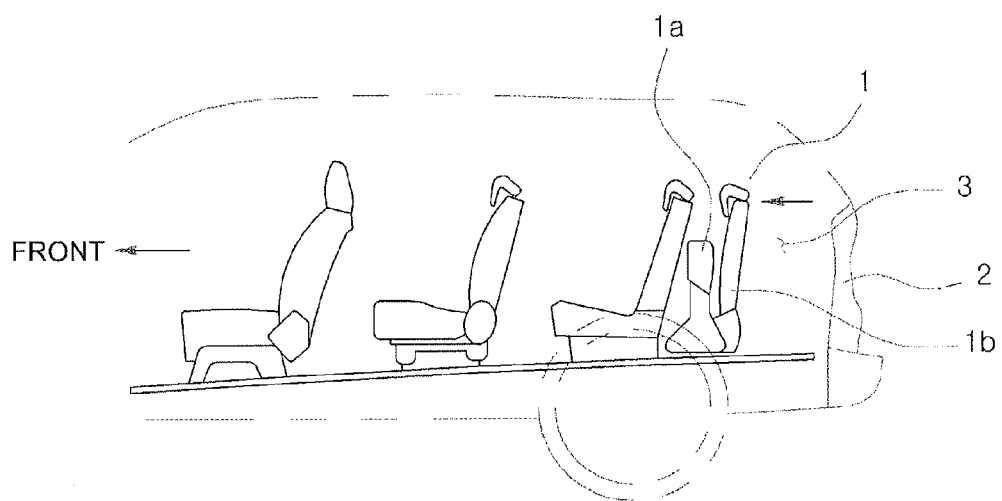
FIG. 1 is a view illustrating a multipurpose vehicle of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

A storing apparatus of a rear seat for a multipurpose vehicle according to an exemplary embodiment of the present invention is described hereafter in detail with reference to the accompanying drawings.

Figure 2:
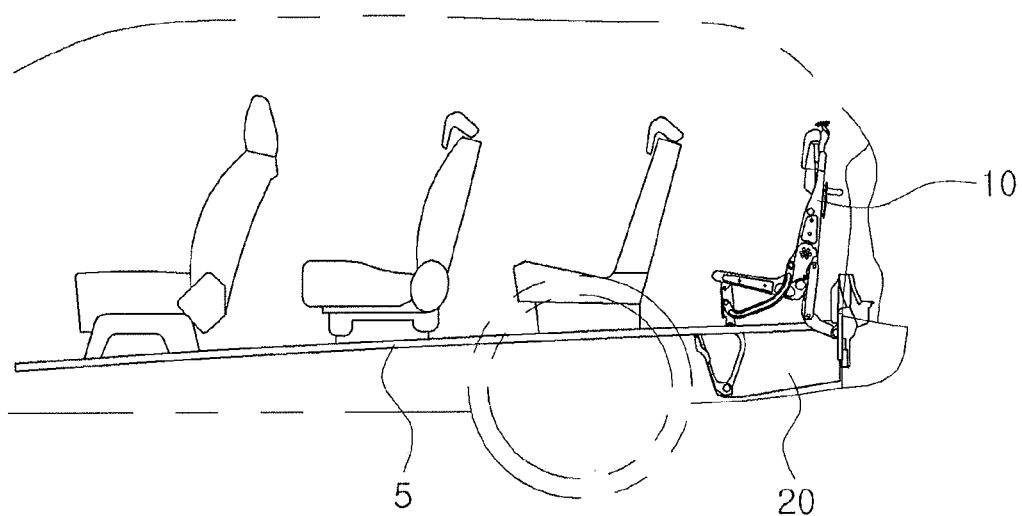
FIG. 2 is a view of a multipurpose vehicle equipped with a storing apparatus for a rear seat according to an exemplary embodiment of the present invention.
Figure 2:
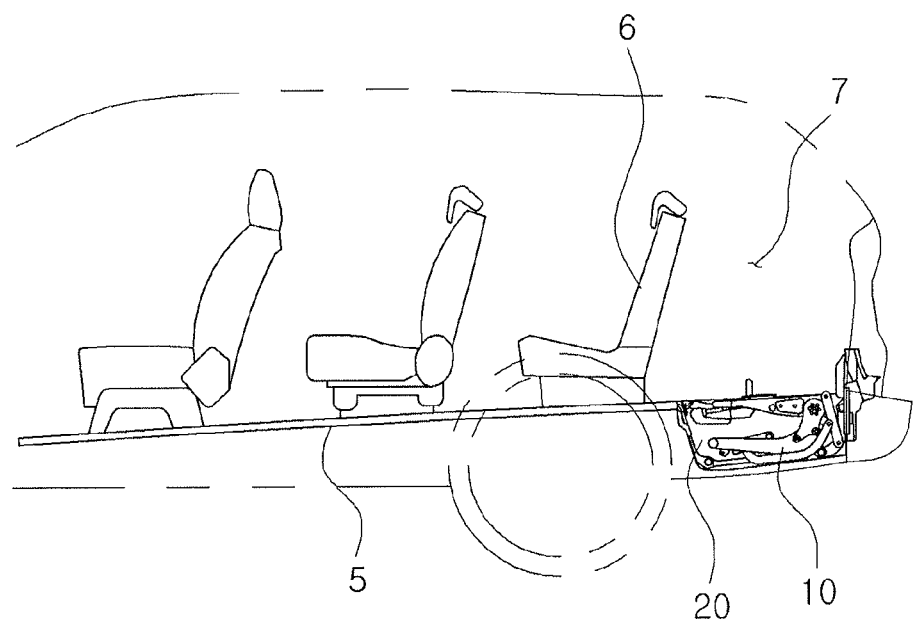

FIG. 2A shows a sitting mode in which a passenger can sit on the rearmost seat 10 disposed in a multipurpose vehicle and FIG. 2B shows a storage mode in which the rearmost seat 10 is stored in a storage space 20 provided by a floor panel 5.

It is possible to ensure a relatively wide luggage space behind three-line seats 6 in the storage mode of the rearmost seat 10.

The storing apparatus of a rear seat for a multipurpose vehicle according to an exemplary embodiment of the present invention includes, as shown in FIGS. 2 to 6, a storage space 20 provided by the floor panel 5 under the rearmost seat 10, and a plurality of link mechanisms disposed to connect the seat 10 with the storage space in order to implement the storage mode in which the seat 10 is moved down and received in the storage space 20 and the sitting mode in which the seat 10 is drawn upward from the storage space 20.

The link mechanism includes a front link 30 rotatably connecting the front portion of the storage space 20 with the front portion of the seat cushion 11 and a rear link 40 rotatably connecting the rear portion of the storage space 20 with a seat back 12.

Further, the link mechanism further includes a front connection link 50 that has one end rotatably connected to the seat back 12 and the other end rotatably connected to the front link 30 to maintain the sitting mode by providing a reaction force such that the front link 30 cannot rotate to the storage space 20 when a force that rotates the front link 30 about the joint with the storage space 20 toward the storage space 20 is applied to the front link 30 in the sitting mode.

The front link 30 includes a lower link 31 having one end rotatably coupled to the front lower end portion of the storage space 20 by a first hinge shaft 31a and an upper link 32 having one end rotatably coupled to the front portion of the seat cushion 11 by a second hinge shaft, the other end rotatably coupled to the lower link 31 by a third hinge shaft 32b, and the middle portion where one end of the front connection link 50 is rotatably coupled.

Further, the rear link 40 has one end rotatably coupled to the rear portion of the storage space 20 by a fourth hinge shaft 41 and rotatably coupled to the seat back 12 by a fifth hinge shaft 42.

The front connection link 50 has one end rotatably connected to the seat back 12 by a sixth hinge shaft 51 and the other end rotatably coupled to the middle portion of the front link 30 by a seventh hinge shaft 52.

Further, the link mechanism further includes a rear connection link 60 that has one end rotatably connected to the seat back 12 by an eighth hinge shaft 61 and the other end rotatably connected to the rear link 40 by a ninth hinge shaft 62 in order to maintain the sitting mode by providing a reaction force such that the rear link 40 cannot rotate toward the storage space 20 when a force that rotates the rear link 40 about the fourth hinge shaft 41 toward the storage space 20 in the sitting mode.

Further, the fourth hinge shaft 41 rotatably connecting the rear portion of the storage space 20 with the rear link 40 is equipped with a torsion spring 71 with both ends supported in the storage space 20 and by the rear link 40.

The torsion spring 71 provides an elastic force to the rear link 40 to help the rotation of the rear link 40 drawn out from the storage space 20 when the seat 10 is converted from the storage mode into the sitting mode.

Meanwhile, a pull lever 72 protruding rearward is mounted on the seat back 12 and connected with a recliner lever 73 by a wire 74, and the recliner lever 73 is integrally coupled to one end of a recliner shaft 76 of a recliner 75.

The recliner 75 is disposed at the joint of the seat cushion 11 and the seat back 12 and adjusts the forward/rearward rotational angle of the seat back 12 while being locked and unlocked by rotation of the recliner shaft 76 due to the operation of the recliner lever 73.

The operation of the apparatus of the present invention is described hereafter.

Figure 3:
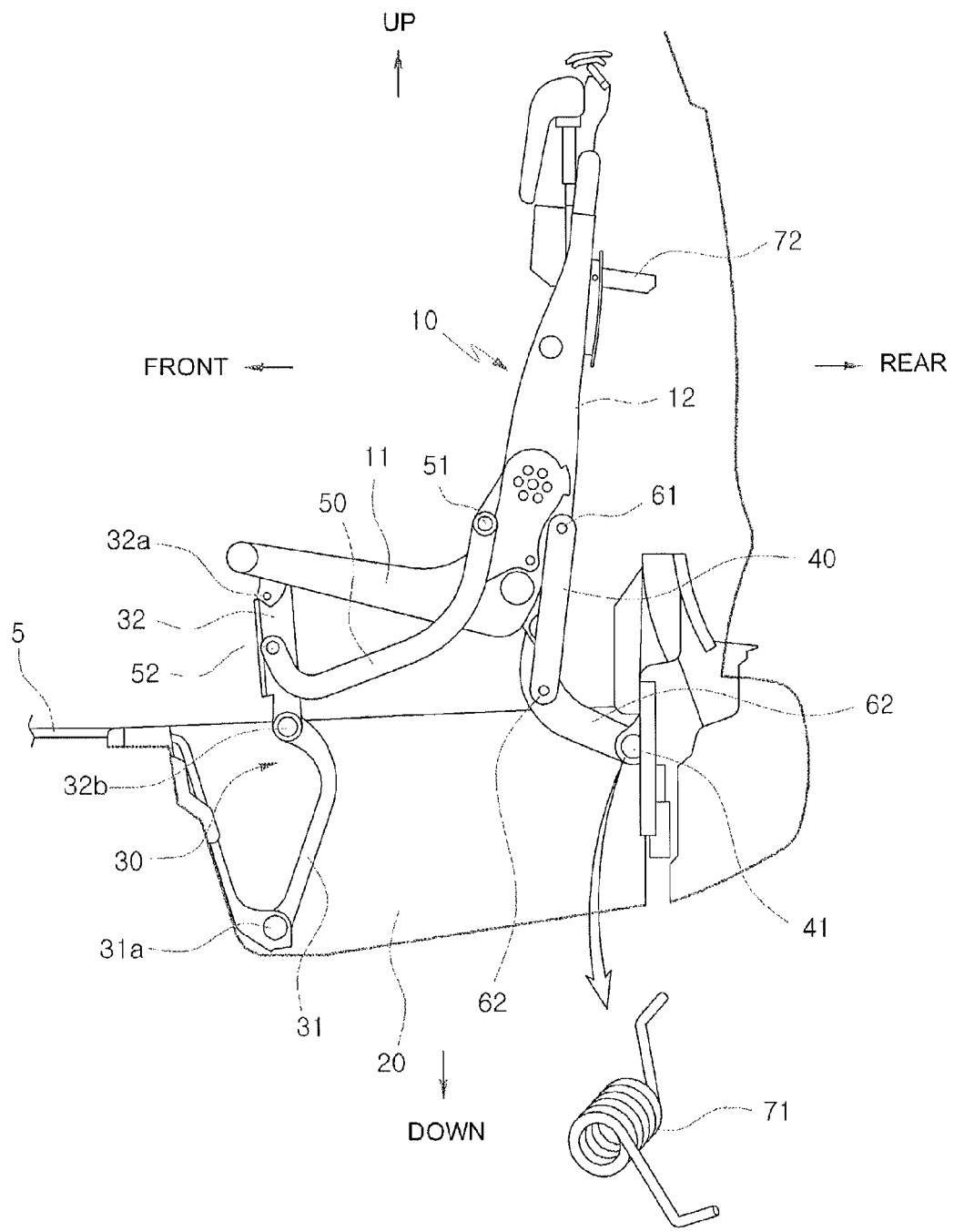
FIGS. 3 and 4 are views illustrating a storing apparatus of a rear seat for a multipurpose vehicle according to an exemplary embodiment of the present invention.

FIG. 3 shows a sitting mode in which the rearmost seat 10 protrudes above the storage space 20.

When a passenger sits on the seat 10 in the sitting mode, load is applied to the seat 10, such that a force that rotates the lower link 31 clockwise about the first hinge shaft 31a from the state shown in the figure is applied to the lower link 31, but the front connection link 50 is connected with the upper link 32 and supports the upper link 32, such that the lower link 31 connected with the upper link 32 cannot rotate about the first hinge shaft 31 by the support force of the front connection link 50, and accordingly, the front link 30 can maintain the sitting mode.

Further, a force that rotates the rear link 40 counterclockwise about the fourth hinge shaft 41 is applied to the rear link 40, but a rearward force is applied to the seat back 12 by the pressing force of the passenger sitting on the seat 10, such that a force that moves the ninth hinge shaft 62 upward from the state shown in the figure is applied to the rear connection link 60, therefore, the rear link 40 connected with the rear connection link 60 cannot rotate about the fourth hinge shaft 41 by the supporting force of the rear connection link 60, and accordingly, the rear link 40 can maintain the sitting mode.

Figure 5:
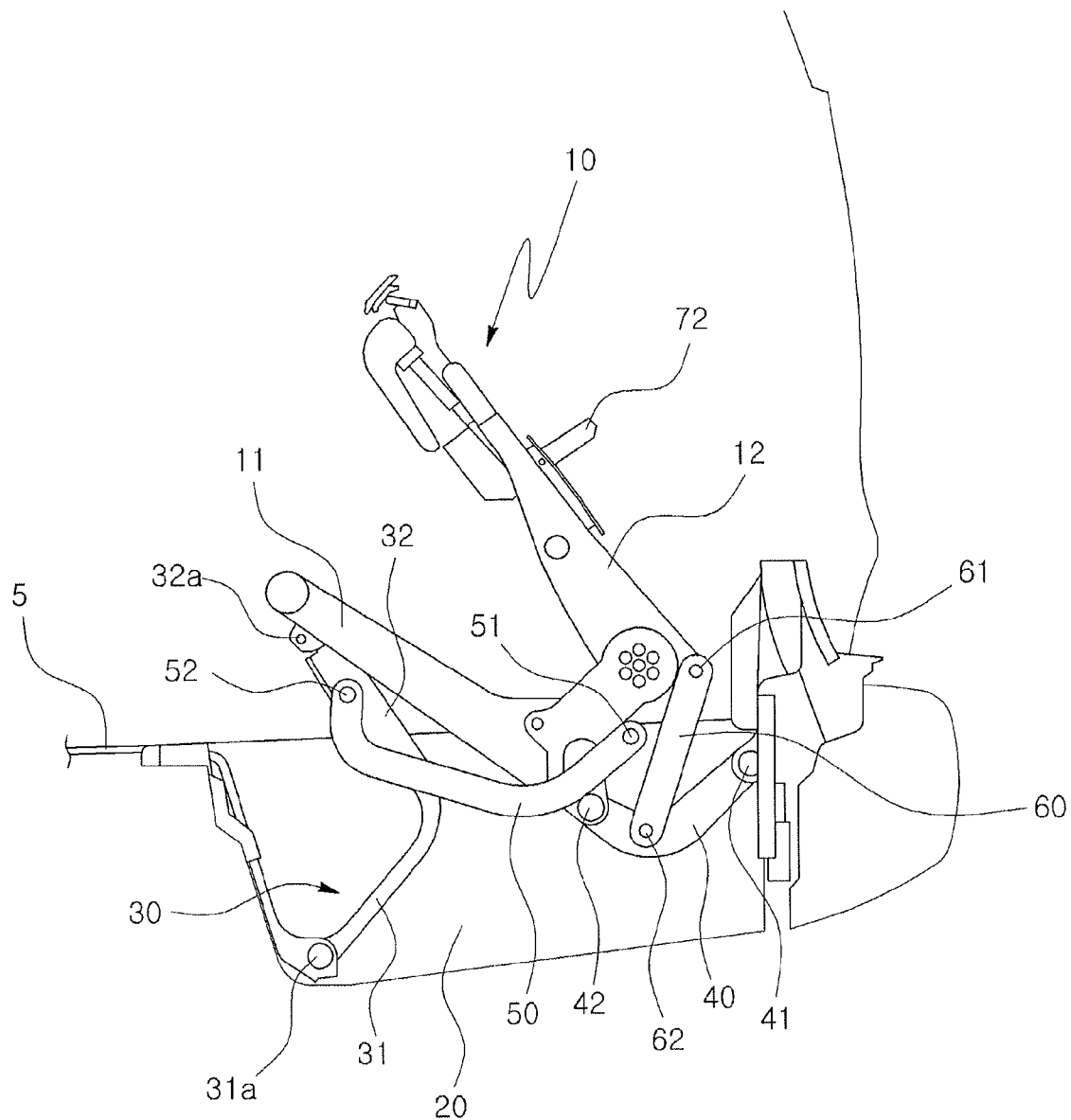
FIGS. 5 and 6 are views illustrating the process of operation of the storing apparatus of a rear seat for a multipurpose vehicle according to an exemplary embodiment of the present invention.

Further, when a worker unlocks the recliner 75 by operating the recliner lever 73 to ensure the luggage space 7, the seat back 12 vertically positioned, as shown in FIG. 3, is folded toward the seat cushion 11, as shown in FIG. 5.

Further, when the worker presses down the seat cushion 11, from the state of FIG. 3, the lower link 31 rotates clockwise about the first hinge shaft 31a, the upper link 32 rotates counterclockwise about the second hinge shaft 32a, the front connection link 50 rotates counterclockwise about the sixth hinge shaft 51, the rear link rotates counterclockwise about the fourth hinge shaft 41, and the rear connection link 60 rotates clockwise about the ninth hinge shaft 62.

Accordingly, the front link 30, the rear link 40, the front connection link 50, and the rear connection link 60 are folded with each other, as shown in FIG. 5, and the seat cushion 11 is received into the storage space 20 while moving down from the rear portion.

When the seat 10 keep moving down, the seat cushion 11 and the seat back 12 are fully folded and completely received in the storage space 20 provided by the floor panel 5, such that the seat 10 is converted into the storage mode.

Figure 6:
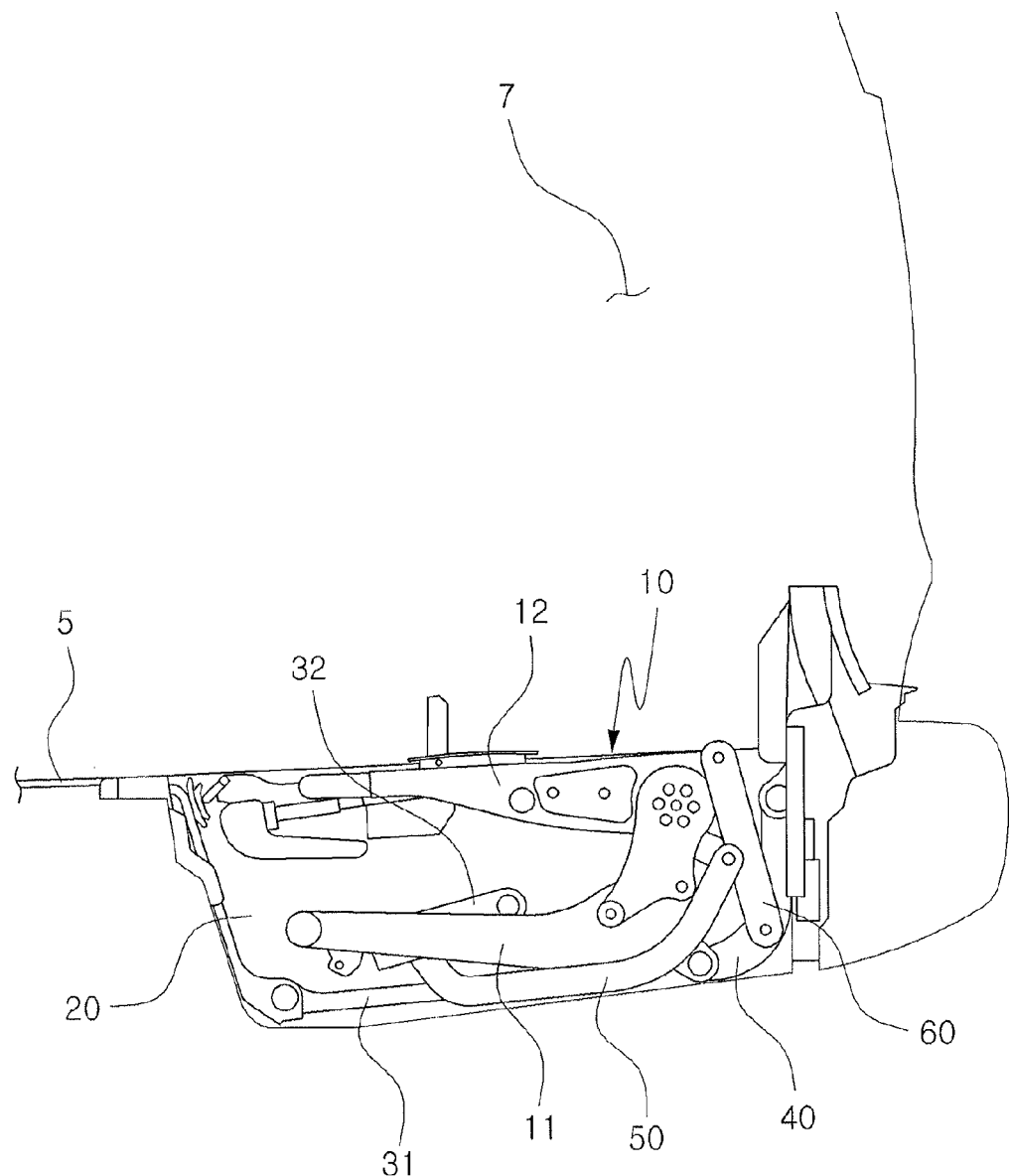

When the seat 10 is completely received in the storage space 20, as shown in FIG. 6, the portion where the rearmost seat 10 was placed in the multipurpose vehicle becomes completely empty, a sufficiently wide luggage space 7 can be ensured.

Further, since the present invention has the configuration that makes it possible to ensure the luggage space 7 without moving the seat 10 forward/rearward, it has the advantage that it is not necessary to dispose a seat rail and it is correspondingly possible to reduce the weight and the cost.

Meanwhile, the worker holds and pulls the pull lever 72 to convert the seat 10 from the storage mode shown in FIG. 6 into the sitting mode.

As the pull lever 72 is pulled, the recliner lever 73 connected by the wire 74 operates, such that the recliner 73 is unlocked again while the seat back 12 is converted into the state in which it can rotate with respect to the seat cushion 11.

Figure 4:
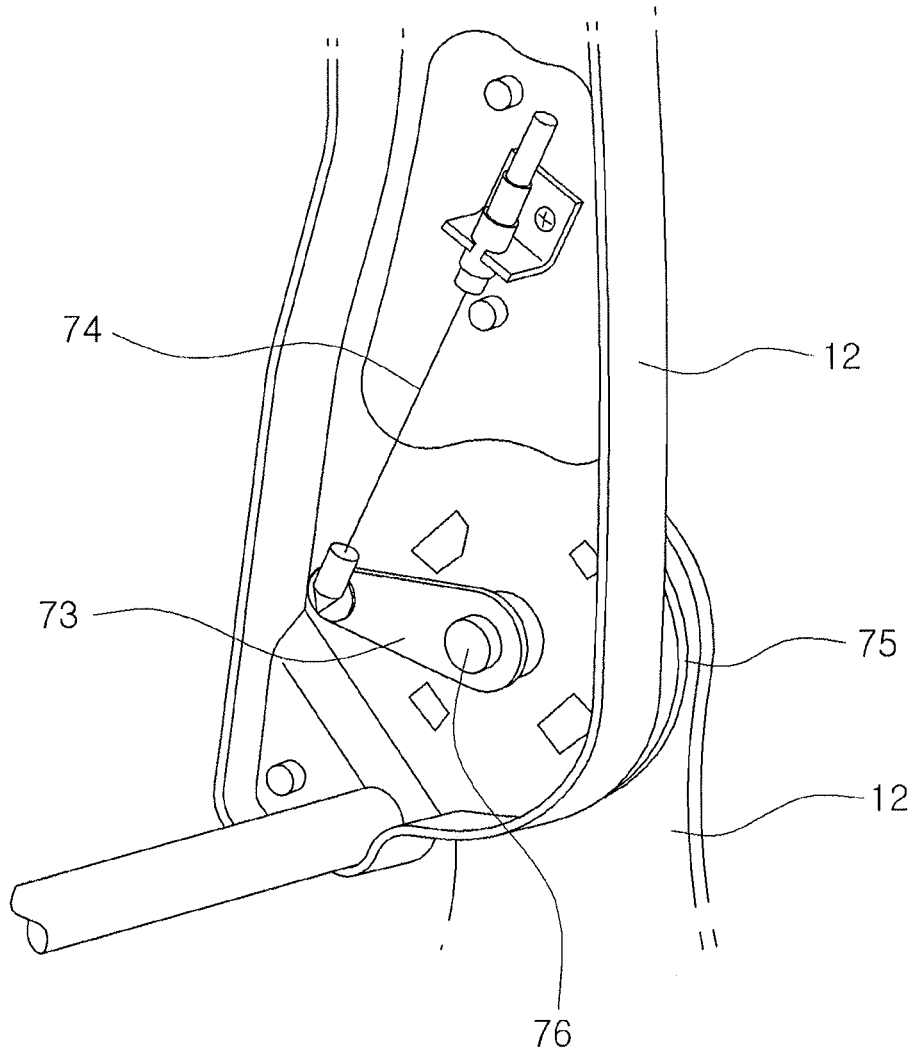

As the worker lifts the seat 10 while pulling the pull lever 72, the seat 10 received in the storage space 20 is drawn upward by the operation of the link mechanism in the inverse order, as shown in FIGS. 4 and 5, and the seat 10 is finally converted into the sitting mode, as shown in FIG. 3, which is implemented in the inverse order of the description when the seat 10 is converted into the storage mode from the sitting mode and is not described.

As described above, since the seat 10 is converted into the storage mode by being received in the storage space 20 by the floor panel 5 by downward moving of the rearmost seat 10 and the storage mode is converted into the sitting mode by moving up the seat 10, the storing apparatus of a rear seat for a multipurpose vehicle has the advantage that it is possible to ensure the wider luggage space 7 with a relatively simple configuration.

Further, the present invention has the advantage that it is not necessary to dispose a seat rail because it is possible to ensure the luggage space 7 without moving the seat 10 forward/rearward, such that it is possible to reduce the weight and the cost.

Although the present invention was described with reference to a specific embodiment, it is apparent to those skilled in the art that the present invention may be changed and modified in various ways without departing from the scope of the present invention which is provided in the following claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A storing apparatus of a rearmost seat for a multipurpose vehicle comprising:
    a storage space provided under a floor panel;
    wherein the rearmost seat is selectively stored in the storage space;
    wherein the rearmost sear includes a plurality of links disposed to pivotally connect the rearmost seat with the storage space to implement a storage mode in which the seat is moved down and received in the storage space and a sitting mode in which the seat is drawn upward out of the storage space; and
    wherein the plurality of links includes:
        a front link rotatably connecting a front portion of the storage space with a front portion of a seat cushion, and
        a rear link rotatably connecting a rear portion of the storage space with a seat back to which a rear portion of the seat cushion is pivotally coupled.

2. The apparatus of claim 1, wherein the plurality of links further includes a front connection link that has one end rotatably connected to the seat back and the other end rotatably connected to the front link.

3. The apparatus of claim 2, wherein the one end of the front connection link is disposed higher than a portion in which the rear portion of the seat cushion is pivotally coupled to the seat back in the sitting mode.

4. The apparatus of claim 2, wherein the front link includes:
    a lower link having one end rotatably coupled to a front lower end portion of the storage space; and
    an upper link having one end rotatably coupled to the front portion of the seat cushion, the other end rotatably coupled to the other end of the lower link, and a middle portion to which the one end of the front connection link is rotatably coupled.

5. The apparatus of claim 4, wherein the plurality of links further includes a rear connection link that has one end rotatably connected to the seat back and the other end rotatably connected to a middle portion of the rear link.

6. The apparatus of claim 1, wherein a hinge shaft rotatably connecting the rear portion of the storage space with the rear link is equipped with a torsion spring with both ends supported in the storage space and by the rear link, and the torsion spring provides an elastic force to the rear link to help a rotation of the rear link drawn out from the storage space when the seat is converted from the storage mode into the sitting mode.

7. The apparatus of claim 1, wherein a pull lever protruding rearward is mounted on the seat back and connected with a recliner lever by a wire, and the recliner lever is integrally coupled to one end of a recliner shaft of the recliner.

* * * * *